P. SCHUH, Jr.
HEATER FOR POULTRY WATERING DEVICES.
APPLICATION FILED FEB. 11, 1916.

1,209,045.

Patented Dec. 19, 1916.

Philip Schuh, Jr.,
Inventor

By Geo. P. Kimmel.
Attorney

UNITED STATES PATENT OFFICE.

PHILIP SCHUH, JR., OF KEENSBURG, ILLINOIS.

HEATER FOR POULTRY-WATERING DEVICES.

1,209,045.  Specification of Letters Patent.  Patented Dec. 19, 1916.

Application filed February 11, 1916. Serial No. 77,768.

*To all whom it may concern:*

Be it known that I, PHILIP SCHUH, Jr., a citizen of the United States, residing at Keensburg, in the county of Wabash and State of Illinois, have invented certain new and useful Improvements in Heaters for Poultry-Watering Devices, of which the following is a specification.

The present invention relates to poultry watering devices, and more particularly to new and useful improvements in heaters for poultry watering devices.

An object of this invention is to embody in a simple, cheap and durable construction an effective heating device of the class described, whereby the contents of a poultry feeding or watering receptacle may be maintained at an even temperature. Of course, the device is particularly adapted to watering devices for poultry, but I do not limit myself to its adaptation to such purpose.

Another object of this invention is to provide a container for water or the like which is provided with heat conveying means and a detachable heat deflector.

A further object of this invention is to detachably associate all of the elements of the device to permit cleansing or repair.

Other objects and the advantages existent in my invention will appear from the following detail description and claim, taken with an inspection of the accompanying drawing, in which—

Figure 1:
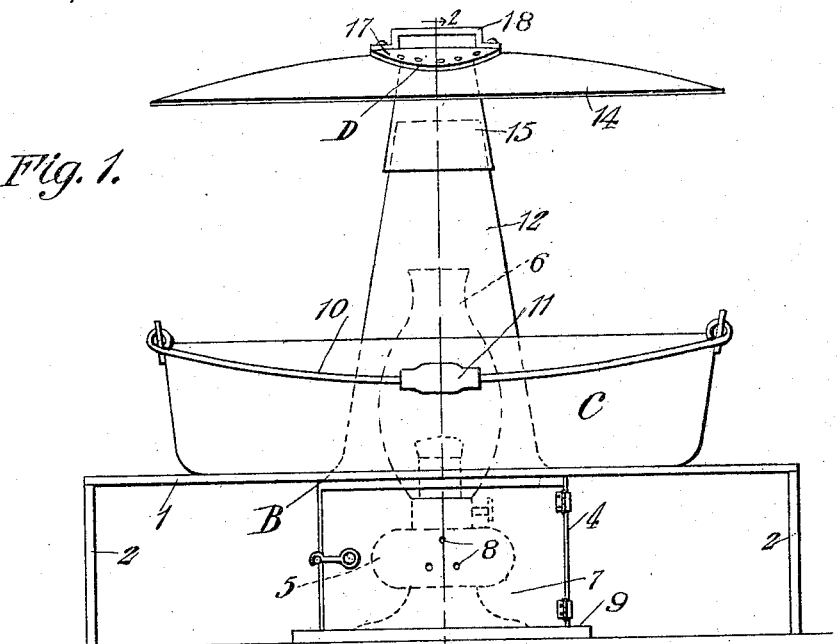
Figure 2:
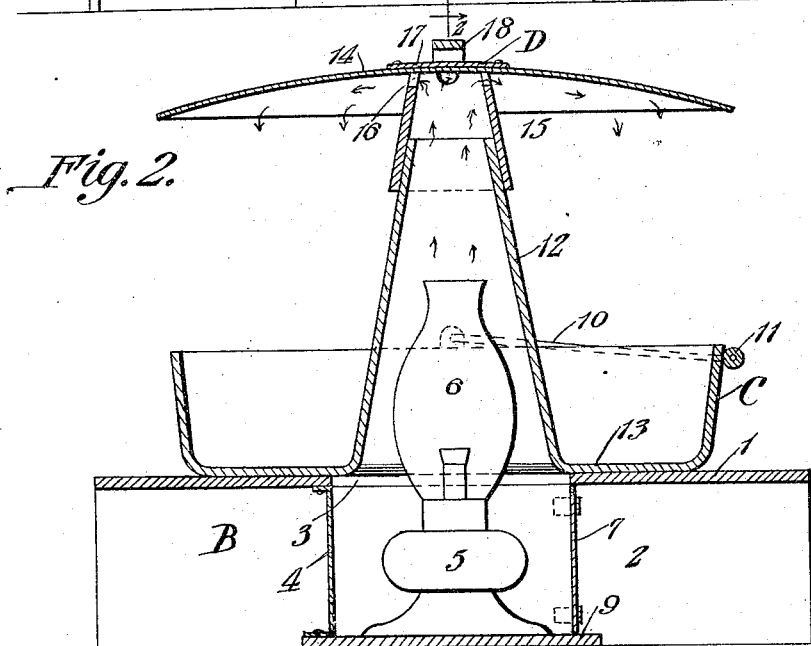

Figure 1 is a front side elevational view of my improved poultry heater, and Fig. 2 is a vertical sectional view taken on line 2—2 of Fig. 1.

Referring more particularly to the drawing, wherein similar reference characters designate like and corresponding parts throughout the various views, B designates in its entirety a base having a top portion 1 and end supporting legs 2. The top 1 is provided with an opening 3 below which is arranged a housing 4 adapted to receive a lamp or similar heat generator, the chimney 6 of which projects beyond the top portion 1 for a purpose which will hereinafter appear. The housing 4 is formed preferably of sheet metal and is provided with a hinged door 7 having air inlet openings 8 therein. The housing is provided with a base 9.

The liquid container of my invention is designated C in its entirety and is provided with the usual bail 10 and handle 11. A heat conveying conduit member 12 is provided extending upwardly from the bottom 13 of the container, said conduit 12 being substantially frusto-conical and located centrally of the container over the lamp chimney 6.

I provide a deflector designated D in its entirety and comprising a concavo-convex hood 14 having a flared relatively short tubular extension 15 arranged thereon and centrally thereof, said extension having a plurality of openings 16 therein adjacent its juncture with the hood to allow heat to escape when the device is in use. A reinforcing disk 17 is riveted or otherwise secured on the hood 14 and a handle 18 is mounted thereon.

In use the lamp is lighted and placed in the housing as shown. The container is now placed over the lamp and filled. The hood 14 may now be placed on the upper end of the conduit 12 and the heat generated by said lamp will take the path indicated by the arrows, being conveyed upwardly and outwardly and directed downwardly onto the contents of the container, thus keeping the contents at an even temperature. An advantage of my invention resides in the provision of the wide hood, whereby should the fowls roost on the same the water cannot be polluted.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as described.

What I claim as my invention and desire to secure by Letters Patent is:

In a poultry fountain, a base member having an opening formed in the top thereof, a housing in said base adapted to receive a heat deflector, a container having an opening in the center thereof and registering with first said opening, said container having an upstanding tapering conduit located centrally thereof, a concavo-convex deflector member, a tubular member mounted upon said deflector and connected with the upper end of said conduit, the deflector being greater in diameter than the container providing the dual function of a protector and deflector, the tubular member having openings therein at the junction of the deflector and said tubular member providing means for the escapement of the products of combustions into contact with the heat deflector for the purposes specified.

In testimony whereof I affix my signature hereto.

PHILIP SCHUH, Jr.

Copies of this patent may be obtained for five cents each, by addressing the "Commissioner of Patents, Washington, D. C."